UNITED STATES PATENT OFFICE.

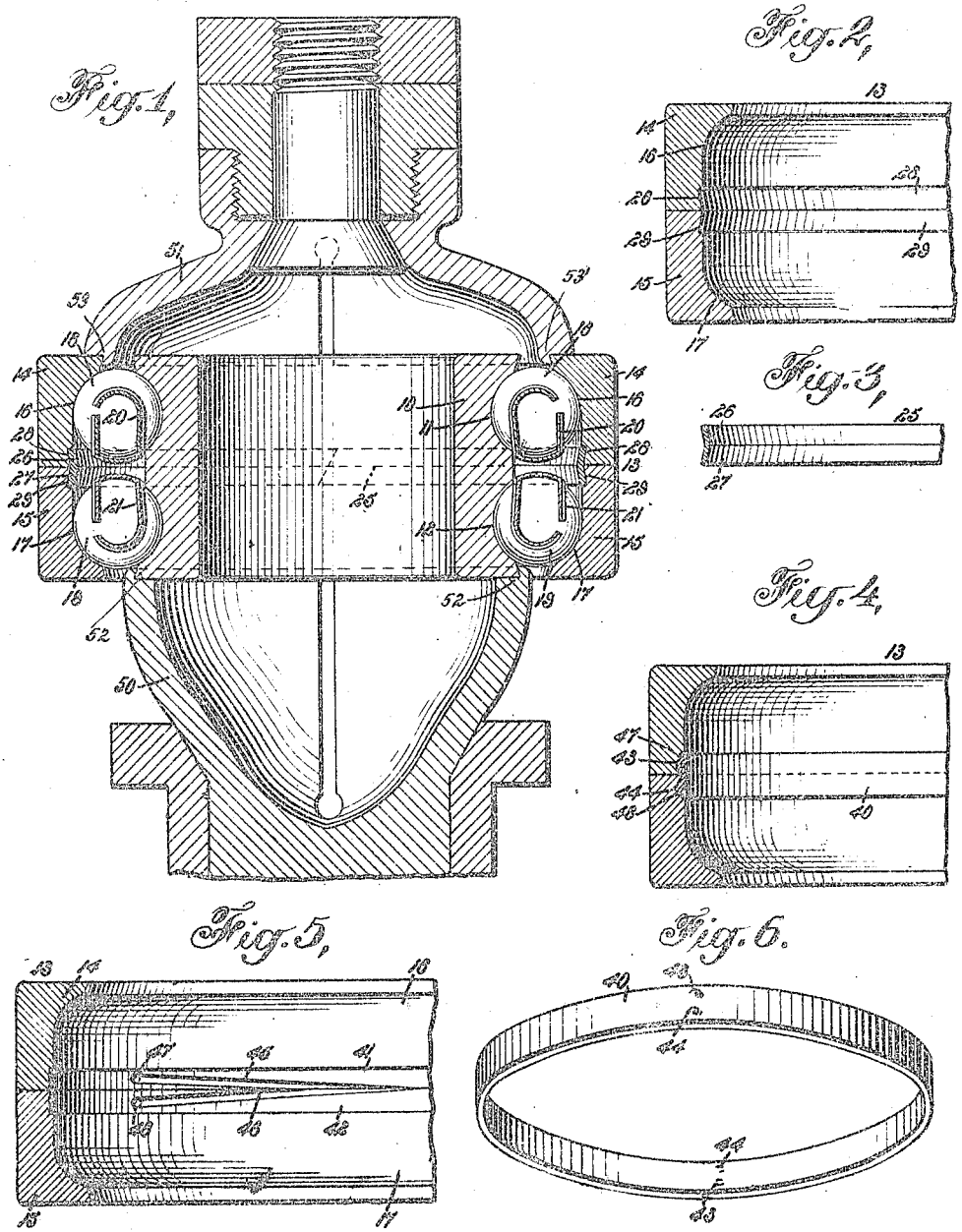

FRANK STARIN, OF SPRINGFIELD, MASSACHUSETTS.

BALL-BEARING.

1,206,482.  Specification of Letters Patent.  Patented Nov. 28, 1916.

Application filed April 27, 1916. Serial No. 93,886.

*To all whom it may concern:*

Be it known that I, FRANK STARIN, a subject of the Emperor of Austria-Hungary, and a resident of Springfield, in the county of Hampden and State of Massachusetts, have invented a new and Improved Ball-Bearing, of which the following is a full, clear, and exact description.

The object of the invention is to provide a new and improved ball bearing having two cages filled with bearing balls and arranged to permit of conveniently assembling the parts and without producing undesirable projections on the inner or cone member and the outer casing or cup.

In order to accomplish the desired result, use is made of an inner or cone member provided on its peripheral face with two annular ball races, an outer casing or cup made in two parts and each having an inner ball race in register with a corresponding ball race of the said inner member, and an interior locking ring engaging the parts of the outer casing at their joint to fasten the same together.

A practical embodiment of the invention is represented in the accompanying drawings forming a part of this specification, in which similar characters of reference indicate corresponding parts in all the views.

Figure 1 is a sectional plan view of the ball bearing in position in the assembling chucks; Fig. 2 is a sectional plan view of a portion of the outer casing or cup; Fig. 3 is a sectional plan view of a portion of the interior locking ring; Fig. 4 is a sectional plan view of a portion of an outer casing and locking ring of modified form; Fig. 5 is a similar view of the outer casing of the modified form shown in Fig. 4; and Fig. 6 is a perspective view of the locking ring of the modified form shown in Fig. 4.

The inner or cone member 10 of the ball bearing is provided on its peripheral face with parallel ball races 11 and 12, and the outer casing or cup 13 of the ball bearing is made in two ring-shaped parts 14 and 15 having their inner faces abutting, as plainly shown in the drawings. The casing parts 14 and 15 are provided at their inner faces with ball races 16 and 17 located directly opposite the ball races 11 and 12, respectively. The registering ball races 11 and 16 are engaged by balls 18, and similar balls 19 engage the ball races 12 and 17, and the said sets of balls 18 and 19 are held in cages 20 and 21 of any approved construction, preferably, however, of the construction as shown in the applications for Letters Patent of the United States, Serial Nos. 93,884 and 93,885 filed under even date herewith, so that further detail description of the construction of the said cages is not deemed necessary.

In order to fasten the casing parts 14 and 15 together, use is made of an internal locking ring 25 made V-shape in cross section thereby forming two diverging wings 26 and 27 adapted to fit into correspondingly shaped annular grooves 28 and 29 formed in the inner faces of the casing parts 14 and 15 adjacent the joint thereof, that is, intermediate the ball races 16 and 17. By the arrangement described the casing parts 14 and 15 are securely fastened together interiorly thus presenting no projections on the peripheral faces of the said casing parts. The locking ring 25 may be split as indicated in dotted lines in Fig. 1.

In assembling the parts forming the ball bearing, the cage 21 is placed in position on the member 10 at the ball race 12 and the balls 19 are then placed in position on the cage 21 and seated on the ball race 12. The casing member 15 is next placed in engagement with the sets of balls 19. The locking ring 25 is next engaged by its wing 27 with the annular groove 29 and then the cage 20 is placed in position around the inner member 10 and the balls 18 are engaged with the said cage 20 and seated on the ball race 11. The operator now places the casing part 14 in position so that the wing 26 of the locking ring 25 is engaged by the groove 28.

Instead of making the locking ring 25 V-shape in cross section, it may be in the form of a plain split ring 40, as shown in Fig. 6, and in this case the casing parts 14 and 15 are provided with registering internal grooves 41 and 42 for the reception of the locking ring 40. The locking ring 40 is provided with one or more sets of struck-up lugs 43 and 44 adapted to pass along diverging channels 45 and 46 formed in the back walls of the grooves 41 and 42. The channels 45 and 46 terminate in recesses 47 and 48 into which fit the lugs 43 and 44 so that the two casing parts 14 and 15 are securely locked together by the internal ring 40.

In the manufacture of the parts 10, 14 and 15, the rough castings are ground to the correct size and shape, and in order to permit of properly grinding the surfaces of the inner member 10 and the surfaces of the casing parts 14 and 15 to the desired shape and size in a suitable grinding machine, use is made of two spring chucks 50 and 51, of which the chuck 50 is adapted to engage exteriorly one conical end 52 of the inner member 10 to securely hold this member in position while grinding the surfaces thereof to the desired size and shape. The other chuck 31 is adapted to engage interiorly the conical end of either casing part 14 or 15 to hold the same in position while grinding the same to the exact size and shape. It is understood that the jaws 52 of the chuck 50 and the jaws 53 of the chuck 51 are undercut to provide firm seats for the corresponding ends of the member 10 and the casing parts 14 and 15 to firmly hold the same in position in the chucks during the grinding operations.

The ball bearing shown and described is very simple and durable in construction and the parts can be readily assembled.

The special construction of the inner and outer ball bearing rings and the chucks for holding the same will form the subject matter of another application.

Having thus described my invention, I claim as new and desire to secure by Letters Patent:—

1. A ball bearing, comprising an inner member, an outer casing made in two parts, the said inner member and the said casing having oppositely disposed ball races, a locking ring on the inner faces of the casing parts intermediate the ball races thereof, sets of balls in the said races, and cages one for each set of balls.

2. A ball bearing, comprising an inner member provided on its peripheral face with two parallel ball races, an outer ball race casing made in two parts each having an internal ball race directly opposite a corresponding ball race of the said inner member, sets of balls engaging the races, and a cage for confining each set of balls and allowing rotation thereof, and a locking ring for locking the casing parts together at their inner faces and extending across the joint of the casing parts intermediate their ball races.

3. A ball bearing, comprising an inner member provided on its peripheral face with two parallel ball races, an outer ball race casing made in two parts each having an internal ball race directly opposite a corresponding ball race of the said inner member, sets of balls engaging the races, and a cage for confining each set of balls and allowing rotation thereof and a locking ring for locking the casing parts together at their inner faces and extending across the joint of the casing parts intermediate their ball races, the said locking ring being V-shape in cross section thereby forming diverging wings, and the inner faces of the casing parts being provided with annular grooves shaped for the reception of the said diverging wings of the locking ring.

4. A ball bearing, comprising an inner member provided on its peripheral face with two parallel ball races, an outer ball race casing made in two parts each having an internal ball race directly opposite a corresponding ball race of the said inner member, sets of balls engaging the races and a cage for confining each set of balls and allowing rotation thereof, and a locking ring for locking the casing parts together at their inner faces and extending across the joint of the casing parts intermediate their ball races, the said locking ring being V-shaped in cross section thereby forming diverging wings, and the inner faces of the casing parts being provided with annular grooves shaped for the reception of the said diverging wings of the locking ring, the locking ring being provided with a pair of struck-up lugs engaging corresponding recesses in the walls of the said grooves.

5. A ball bearing, comprising an inner member provided on its peripheral face with two parallel ball races, an outer ball race casing made in two parts having an internal ball race directly opposite a corresponding ball race of the said inner member, sets of balls engaging the races and a cage for confining each set of balls and allowing rotation thereof, and a locking ring for locking the casing parts together at their inner faces and extending across the joint of the casing parts intermediate their ball races, the said locking ring being provided with a pair of lugs and the inner faces of the casing parts being provided with annular grooves having channels in their back walls for engagement by the said lugs, the channel diverging from a point at the joint of the casing parts and terminating in recesses engaged by the said lugs.

FRANK STARIN.